July 10, 1945.   N. HUBBARD   2,379,907
WELDROD SLITTER
Filed Sept. 22, 1943   2 Sheets-Sheet 2
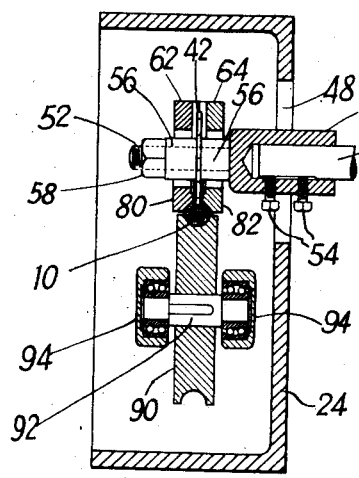
Fig. 5
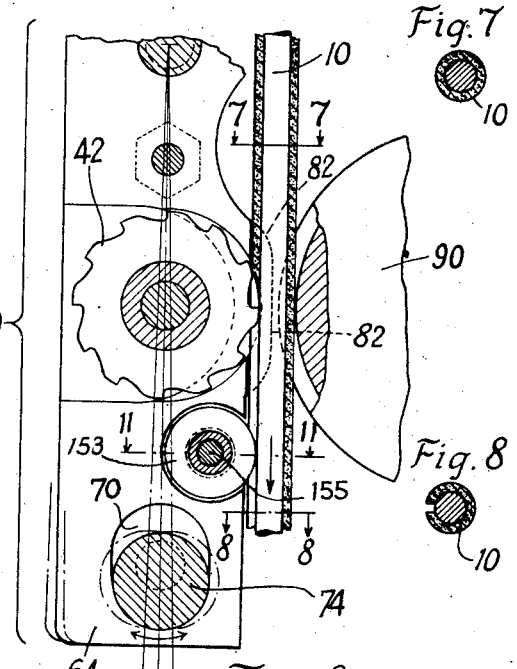
Fig. 6
Fig. 7
Fig. 8
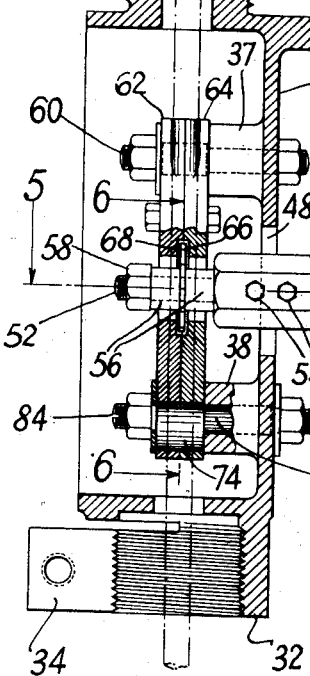
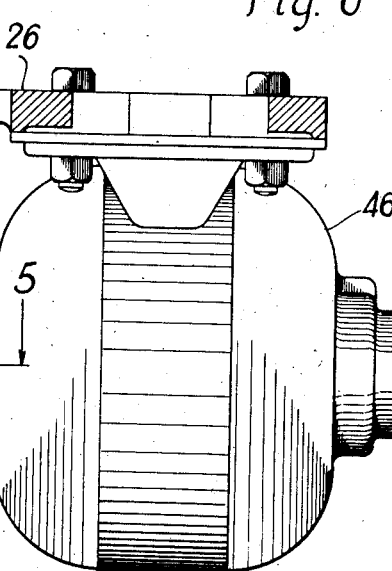
Fig. 4
INVENTOR.
BY Norman Hubbard
ATTORNEY Patented July 10, 1945

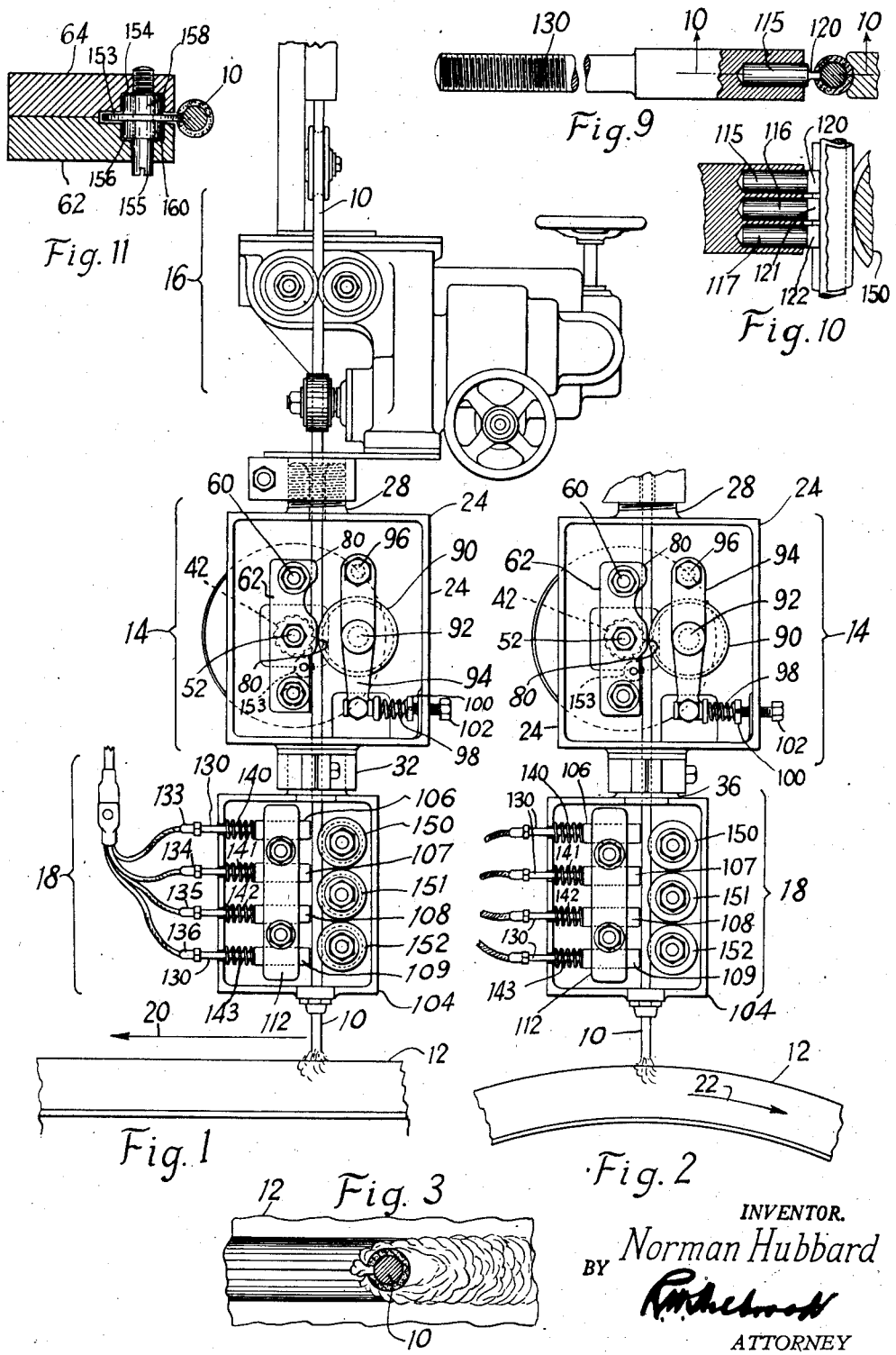

2,379,907

UNITED STATES PATENT OFFICE 2,379,907

WELD ROD SLITTER

Norman Hubbard, Akron, Ohio, assignor to The Babcock & Wilcox Company, Rockleigh, N. J., a corporation of New Jersey Application September 22, 1943, Serial No. 503,341

9 Claims. (Cl. 314—129)

This invention originated in connection with electric arc welding apparatus, and more particularly in connection with the development of a cutting head for use with coated electrodes.

Weldrods supplied for the cutting heads of electric arc welding apparatus are provided with a flux coating which, in many cases is in the form of a sheath substantially enclosing the weldrod. A major purpose of the flux coating is to so protect the arc or the deposited weld metal that the latter will be free from oxidation and impurities. It is important that the flux coating be maintained as a substantial sheath for the metallic weldrod, but it is also necessary in the functioning of the welding head that the sheath be interrupted at intervals or continuously along a narrow longitudinal zone in order that there may be contact between the metal of the weldrod and one or more electrical contactors of the welding apparatus. This invention is concerned with the practice in which the weldrod is bared over a narrow longitudinal zone and includes devices for cutting the flux coating away in a narrow zone without breaking or tearing away substantial parts of the sheath adjacent that zone. Some weldrod coatings are brittle and others are so constituted, that undesirably large parts of the sheath have been removed outside of such narrow longitudinal zones in the baring of the weldrod metal. The invention covers apparatus for overcoming these difficulties.

The invention will be described with reference to the accompanying drawings which illustrate apparatus for grooving or slitting the coating of a weldrod longitudinally to expose the metal of the rod itself.

In the drawings:

Fig. 1 is partly a vertical section and partly an elevation showing a welding head with the illustrative mechanism associated therewith;

Fig. 2 is a view in the nature of a vertical elevation showing the weldrod slitter and electrical contact mechanism of the welding head with the work indicated as moving relative to the head;

Fig. 3 is a diagrammatic view in the nature of a plan looking down upon a weld in process of formation, and including a transverse section of the sheathed weldrod;

Fig. 4 is a vertical section through the weldrod slitter;

Fig. 5 is a horizontal section taken on the line 5—5 of Fig. 4;

Fig. 6 is an enlarged vertical section of the weldrod slitter on the line 6—6 of Fig. 4;

Figs. 7 and 8 are detail sections on the lines 7—7 and 8—8, respectively, of Fig. 6;

Fig. 9 is a detail view in the nature of a horizontal section through a part of a contact shoe;

Fig. 10 is a detail sectional view on a plane indicated by the line 10—10 of Fig. 9, and Fig. 11 is a transverse or horizontal section of the idler roller structure, taken on the line 11—11 of Fig. 6.

In Fig. 1 the consumable weldrod 10 is fed to the work 12 through the illustrative slitter 14 from the feeding and guiding mechanism 16. Below the slitter 14 there is an electric contact mechanism indicated in its entirety at 18. Through this contact mechanism, electric current is conducted to the metal of the weldrod 10 so that the desired polarity between the weldrod and the work 12 may exist.

As the welding process is carried on there is relative motion between the work 12 and the welding apparatus, this relative motion being indicated at 20 in Fig. 1. This relative motion is such, and the slitter and contact mechanism 18 are so arranged with reference to the relative motion that the slitted side of the weldrod is its leading side. Preferably, this figure illustrates an arrangement used in making a longitudinal seam weld between spaced plate sections constituting the work 12, and the welding apparatus including the slitter moves along the seam, while the plates are held stationary. Fig. 2 illustrates the formation of the circumferential seam of the vessel wherein the work is rotating in the direction of the arrow 22 while the slitter and the welding mechanism are stationary.

The illustrative slitter is shown in detail in Figs. 4–6. It includes a casing portion or box 24 having a lateral horizontal flange 26 projecting from its top rear part. This casing is formed with a male threaded spike or guide piece 28 through which the weldrod 10 is guided to the slitter, the weldrod moving in the direction of the arrow 30. This extension or guide piece is provided with a bell-shaped core as clearly shown in the drawings. At the lower part of the casing 24 there is an internally threaded extension 32 designed to be threaded upon and clamped to a trunnion member extending upwardly from the contact mechanism housing. This extension is provided with projecting clamp arms 34 which may be tightened together around a trunnion member 36 projecting upwardly from the housing of the contact mechanism 18. This latter trunnion member has a bore axially aligned with that of the extension 28, with the weldrod passing through the slitter toward the welding arc.

The slitter casing is also provided with two inwardly projecting bosses 37 and 38 for adjustably supporting the shroud 40 for the weldrod, and the flux cutter 42. This cutter is fixed to the shaft 44 of a motor 46 secured to the casing extension 26, the cutter mechanism being operated through an opening 48 formed in the wall of the slitter casing 24 as clearly shown in Fig. 4. To mount the cutter upon the motor shaft there is a coupling 50 having a threaded projection 52. This coupling is slidably mounted upon the motor shaft 44 and is adjustably secured thereon by set screws 54. The cutter, of the saw type, is mounted on the projection 52 between collars 56 and is secured in its operative position by a nut 58.

The shroud 40 is supported independently of the cutter 42 and it is turnably mounted upon a bolt 60 projecting through the boss 37 of the slitter casing. As shown, the shroud consists of opposite parts 62 and 64 recessed as indicated at 66 and 68 to provide clearance for the cutter. Near the bottom of the shroud its main members 62 and 64 are provided with a slot 70 with its long dimension lengthwise of the shroud. A shaft or trunnion 72, with an eccentric part 74, extends through the lower boss 38 and the shroud, and it is so positioned that its eccentric part 74 is turnably disposed in the slot 70.

As indicated in Figs. 1, 5, and 6, the shroud members 62 and 64 are provided with extensions 80 and 82 having their inner surfaces, or edge parts, formed to closely and slidably fit the weldrod coating and to hold the coating closely adjacent the margins of the zone of cutting action so that the coaing will no be torn or broken away.

The depth of the slot cut in the weldrod coating may be varied by loosening the nut on the outer end of member 60 and both nuts on the member 72, and by a screw driver inserted in the kerf 84 in the outer end of the member 72, revolving the member 72 to swing the shroud 40 about its fulcrum 60 by means of the eccentric portion 74 of 72. When, by this means, the desired relation of the cutter 42 to the metal core of the weldrod is attained, the nuts are tightened to lock the shroud in fixed position.

Variations in the thickness of the weldrod coating have been found to undesirably affect the efficiency of the cutter, and to some extent, the constancy of the electric arc, but such variations do sometimes exist. The coating may be eccentric to the rod, varying in different radial directions. To prevent the illustrative slitter from digging into the metallic core of the rod and imposing undue strain on the motor and excess wear on the cutter, when it encounters a zone of thin weldrod coating the idler 153 is provided. Its central portion is in the nature of a disk aligned with the cutter and rotatably supported between the shroud portions 62 and 64 on a pin 155 as indicated in Fig. 11. The latter is screw-threaded into the shroud member 64. The shroud members are provided with circular recesses 154 and 156 of such depth that their bottom surfaces lightly contact the ends of the idler hub projections 158 and 160 to maintain the idler in the plane of the cutter.

In the operation of the slitter, the weldrod is pressed against the idler or the sides of the grooves in the shroud parts 80 and 82 by a backing-up roll 90 turnably mounted upon a trunnion 92 secured midway of two parallel pendulum arms 94 embracing the roll. These pendulum arms are pivoted upon a bolt 96 fixed to the slitter casing 24 in the position indicated in Figs. 1 and 2 of the drawings, and this pendulum construction is cushioned at its lower end by a variable pressure spring assembly including a helical spring 98 and sleeve 100 and a set screw 102.

The backing-up roll 90 is grooved to closely fit against the surface of the weldrod and it approximately encircles one-half of the circumference of the weldrod on its side opposite from the grooves in the shroud extensions 80 and 82, these extensions substantially encircling the remainder of the weldrod surface, on the cutter side.

The electrical contact device includes a casing 104 having the externally threaded extension at its upper end fitting wtihin the threaded extension 32 of the slitter as previously described. Within this casing, there are a plurality of spring pressed shoes 106—109 slidably supported and guided by a guide bar device 112 fixed within the casing 104. As indicated in Figs. 9 and 10 of the drawings, each shoe has a plurality of tungsten dowels 115—117 which have a force fit in round holes in the ends of each shoe bar. These dowels are arranged in a row and their operative ends are ground to form flat sections 120—122 which are aligned to form a fin of such a thickness as to fit within the slot in the electrode coating. These shoe bars have externally threaded extensions 130 for receiving the electrical connectors 133—136.

The extensions 130, as shown in Figs. 1 and 2 of the drawings extend through openings in the left hand wall of the casing 104 and the parts of the extensions within the casing are enclosed by helical springs 140—143, the springs abutting at their right hand ends against the rectangular sections of the shoe bars and their other ends against the wall of the casing 104.

In the zone of the contacting elements 120-122 of the contact shoes 106-109, the weldrod is guided by the grooved rollers 150-152 which engage the weldrod on the side directly opposite the shoe bars.

After completion of the longitudinal seams of a cylindrical pressure vessel with an arrangement wherein the electrical welding device moves longitudinally of the seams as indicated by the arrow 20 in Fig. 1 of the drawings, the same welding apparatus may be used in the formation of circumferential weld seams by arranging the welding apparatus in a fixed position, and causing the work to rotate as indicated by the arrow 22. In this transition, it may be necessary to change the angle of the contact mechanism with reference to the slitter in order that the slotted portion of the electrode may be on its leading side. This may be done in the previously described manner by loosening the clamping members 34 of the extension 32, rotating the contact mechanism to the desired extent and then tightening the clamping members.

Although the invention has been described with reference to the specific mechanism shown in the drawings, it is to be appreciated that it is not limited to all the details thereof, but that it is of a scope comparable with the scope of the subjoined claims.

What is claimed is:

1. In a slitter for flux coated weldrods, a cutter, and means for guiding a coated weldrod into operative engagement with the cutter, said means including a backing-up device and a shroud disposed on opposite sides of the weldrod, said shroud closely fitting the weldrod coating immediately adjacent the zone of the cutting action, the shroud preventing wastage of coating material and providing clean-cut slot edges.

2. A slitter for flux coated weldrods comprising, a rotary cutter of the saw-tooth type, a welding head including means for feeding a weldrod past the cutter, weldrod guiding means including a shroud and a backing-up device on opposite sides of the weldrod, said shroud closely fitting the weldrod coating immediately adjacent the cutter for guiding the weldrod into operative engagement with the cutter and preventing the flaking or breaking off of parts of the weldrod coating externally of the path of the cutter, and electric contact means having an element in operative contact with the metal of the weldrod at the base of the slot formed by the cutter.

3. In electric arc welding mechanism, a welding head including means for advancing a consumable electrode toward the work, a rotary cutter carried by the welding head and having a width much less than the diameter of the weldrod, means for rotating said cutter, shroud means including grooved parts located immediately adjacent the sides of the cutter and closely fitting the surface of the coating of the weldrod, means for holding the weldrod against the shroud, and means for varying the depth of the groove made by said cutter, said last named means including devices by which the shroud mechanism may be adjusted relative to the cutter and toward or away from the weldrod.

4. In an electric welding machine; a welding head including a means for feeding a coated weldrod to a welding zone; electrical contact device including a contact shoe for engaging the metal core of the weldrod through a slot in its coating; and a weldrod coating slitter carried by the welding head and disposed between said feeding mechanism and the electrical contact device; said weldrod slitter including a rotating cutter, a shroud about the cutter and movably supported relative thereto, said shroud having formed therein grooved surfaces adapted to closely fit the coating of the weldrod, and backing up means engaging the weldrod opposite the cutter and holding the weldrod pressed into said groove in the shroud.

5. In a slitter for coated weldrods, a shroud having a surface formed with a groove therein to closely fit the surface of a coated weldrod, means for advancing the weldrod over said surface, means for holding the weldrod against said surface as it is advanced, a toothed rotary cutter operating through an opening formed in the shroud and extending into the groove, and means for independently supporting the cutter and the shroud, means for adjusting the shroud relative to the cutter to vary the depth of the cutter.

6. In apparatus of the class described, means to advance a coated member through a slitting zone, said means including contour shrouding elements substantially half embracing the coated member, a resiliently held guide urging said coated member to a proper seat within the shrouding elements, and a rotary cutter disposed so as to have its active surface cut through the coating at a position opposite the resilient guide.

7. In arc welding apparatus, a welding head, a rotary cutter carried by the head, shroud means including grooved parts located adjacent the sides of the cutter and closely fitting the surface of the weldrod coating, a rotary idler rotatably mounted on the shroud and aligned with the cutter, said idler projecting through an opening between the grooved parts of the shroud to bear upon the surface of the metal core of the weldrod to maintain the same in correct lateral relation to the cutter, means engaging the opposite side of the weldrod for holding the weldrod against the shroud of said idler, and means for varying the depth of cut.

8. In electric arc welding mechanism, a welding head including means for advancing a consumable weldrod toward the work, the weldrod including a metallic core enveloped in a coating of welding composition, a rotating cutter carried by the welding head, shroud means including parts located closely adjacent the sides of the cutter and having faces closely fitting the surface of the coating of the electrode, a rotatable idler operating in contact with the metallic core of the weldrod at the bottom of the groove formed by the cutter, the idler having its axis of rotation normally fixed relative to the faces of the shroud, means for holding the weldrod and the shroud in operative relationship, said last named means including a backing-up member engaging the side of the weldrod opposite the cutter, and means for varying the depth of the groove made by said cutter, whereby weldrod coatings of different thicknesses may be completely cut to the weldrod core.

9. In electric arc welding mechanism, a welding head including means for advancing a consumable weldrod toward the work, the weldrod including a metallic core enveloped in a coating of welding composition, a cutter carried by the welding head, shroud means including parts located closely adjacent the sides of the cutter and having faces closely fitting the surface of the coating of the electrode, an idler operating in contact with metallic core of the weldrod at the bottom of the groove formed by the cutter, the idler being normally fixed relative to the faces of the shroud, means for holding the weldrod and the shroud in operative relationship, said last named means including a backing-up member engaging the side of the weldrod opposite the cutter, and means for varying the depth of the groove made by said cutter, whereby weldrod coatings of different thicknesses may be completely cut to the weldrod core.

NORMAN HUBBARD.